United States Patent [19]

Tsou

[11] 4,231,907
[45] Nov. 4, 1980

[54] CATHODIC ELECTRODEPOSITION COMPOSITIONS EMPLOYING FATTY ACID DERIVATIVES

[75] Inventor: Ivan H. Tsou, Bloomfield Hills, Mich.

[73] Assignee: Grow Group Inc., New York, N.Y.

[21] Appl. No.: 972,208

[22] Filed: Dec. 22, 1978

Related U.S. Application Data

[62] Division of Ser. No. 859,295, Dec. 12, 1977, Pat. No. 4,155,824.

[51] Int. Cl.$^2$ ............... C09D 3/58; C09D 3/80; C09D 5/40
[52] U.S. Cl. ............... 260/23 AR; 204/181 C; 260/18 EP; 260/23 EP
[58] Field of Search .......... 260/23 AR, 23 EP, 18 EP

[56] References Cited

U.S. PATENT DOCUMENTS

| | | | |
|---|---|---|---|
| 3,446,723 | 5/1969 | Poblemann et al. | 204/181 C |
| 3,455,806 | 7/1969 | Spoor et al. | 204/181 C |
| 3,458,420 | 7/1969 | Spoor et al. | 204/181 C |
| 3,468,779 | 9/1969 | Slater et al. | 204/181 C |
| 3,617,458 | 11/1971 | Brockman | 204/181 C |
| 3,666,710 | 5/1972 | Makhlouf et al. | 260/34.2 |
| 3,703,596 | 11/1972 | Marx et al. | 204/181 C |
| 3,730,926 | 5/1973 | Guldenpfennig | 260/18 EP |
| 3,755,093 | 8/1973 | Suematsu | 204/181 C |
| 3,793,278 | 2/1974 | De Bona | 260/29.2 EP |
| 3,799,854 | 3/1974 | Jerabek | 204/181 C |
| 3,804,786 | 4/1974 | Sekmakas | 260/18 PT |
| 3,817,898 | 6/1974 | Ward | 260/29.6 NR |
| 3,839,252 | 10/1974 | Bosso et al. | 260/29.2 EP |
| 3,869,366 | 3/1975 | Suzuki et al. | 204/181 C |
| 3,878,145 | 4/1975 | Guldenpfennig | 260/18 EP |
| 3,891,527 | 6/1975 | Sekmakas | 204/181 C |
| 3,896,017 | 7/1975 | Sekmakas | 204/181 C |
| 3,922,212 | 11/1975 | Gilchrist | 204/181 C |
| 3,925,181 | 12/1975 | McGinniss | 204/181 C |
| 3,928,156 | 12/1975 | Wismer et al. | 204/181 C |
| 3,928,157 | 12/1975 | Suematsu et al. | 204/181 C |
| 3,935,087 | 1/1976 | Jerabek et al. | 204/181 C |
| 3,947,338 | 3/1976 | Jerabek et al. | 204/181 C |
| 3,951,891 | 4/1976 | Topfl et al. | 260/21 |
| 3,953,391 | 4/1976 | Dowbenko et al. | 260/29.6 TA |
| 3,962,499 | 6/1976 | Brody et al. | 260/29.2 EP |
| 3,976,615 | 8/1976 | Sekmakas | 260/29.6 TA |
| 3,984,299 | 10/1976 | Jerabek | 204/181 C |
| 3,988,281 | 10/1976 | Minami et al. | 260/29.6 TA |
| 4,001,101 | 1/1977 | Bosso et al. | 204/181 C |
| 4,001,156 | 1/1977 | Bosso et al. | 260/29.2 EP |
| 4,007,154 | 2/1977 | Schimmel et al. | 260/37 EP |
| 4,009,133 | 2/1977 | Jones | 260/29.2 TN |
| 4,017,438 | 4/1977 | Jerabek et al. | 260/29.2 EP |
| 4,033,917 | 7/1977 | Sekmakas et al. | 260/29.3 |
| 4,036,795 | 7/1977 | Tominaga | 260/18 PN |
| 4,055,527 | 10/1977 | Jozwiak et al. | 260/23.7 A |
| 4,066,525 | 1/1978 | Woo et al. | 204/181 C |
| 4,066,592 | 1/1978 | Wismer et al. | 260/29.2 EP |
| 4,093,594 | 6/1978 | Anderson | 204/181 C |
| 4,136,070 | 1/1979 | Hazan | 204/181 C |
| 4,148,704 | 4/1979 | Tsou | 204/181 C |

FOREIGN PATENT DOCUMENTS

| | | |
|---|---|---|
| 2339398 | 2/1974 | Fed. Rep. of Germany . |
| 2531960 | 7/1975 | Fed. Rep. of Germany . |
| 2611673 | 9/1976 | Fed. Rep. of Germany . |
| 2715259 | 10/1977 | Fed. Rep. of Germany . |
| 1235975 | 6/1971 | United Kingdom . |
| 1253387 | 11/1971 | United Kingdom . |
| 1307585 | 2/1973 | United Kingdom . |

*Primary Examiner*—Ronald W. Griffin
*Attorney, Agent, or Firm*—Burton, Parker & Schramm

[57] ABSTRACT

Described is an organic coating composition particularly useful in cathodic electrodeposition comprising a dispersion, solution or suspension of a coating composition containing an acrylic polymer; the coating composition characterized by being the product of a reaction with a fatty acid and also containing Formula A within said polymer molecule, and said Formula A group being derived from an oxirane ring wherein the coating composition has substantially no oxirane rings therein:

Formula A: $-CH_2-C(Z)-CH_2-N=$

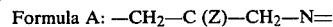

wherein Z is hydrogen, hydroxyl, alkyl ether of 1 to 6 carbon atoms; acyloxy of from 1 to 6 carbon atoms; (=O, as in a ketone)

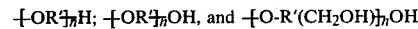

$+OR\frac{1}{n}H; +OR\frac{1}{n}OH,$ and $+O-R'(CH_2OH)\frac{1}{n}OH$ where R' is saturated alkylene of from 2 to 4 carbon atoms and n is from 1 to 6.

16 Claims, No Drawings

CATHODIC ELECTRODEPOSITION COMPOSITIONS EMPLOYING FATTY ACID DERIVATIVES

This is a division of application Ser. No. 859,295, filed Dec. 12, 1977 now U.S. Pat. No. 4,155,824.

BACKGROUND OF THE INVENTION

It has become commercially of significance to employ cathodic electrodeposition coating compositions for improved corrosion resistance can be obtained employing said compositions.

U.S. Pat. No. 4,001,101 teaches the electrodeposition of epoxy compositions which contain boron in the form of boric acid and like compounds. U.S. Pat. No. 4,001,156 teaches a method of producing epoxy group containing quaternary ammonium salt containing resins.

SUMMARY OF THE INVENTION

The present invention is concerned with coating compositions and the cathodic electrodeposition method of applying said coating compositions to produce films on substrates having good corrosion resistant properties, especially having improved property of weather durability particularly on exposure to sunlight and ultraviolet light. In addition there is an improvement in chaulking resistance over the prior art compositions. The prior art compositions are not desirable for outdoor exposure and employ high baking temperature. The coating composition can generally be characterized as being a dispersion, solution or suspension of an acrylic polymer; the coating composition characterized by being the product of a reaction with a fatty acid and also containing Formula A within said polymer molecule, and said Formula A being derived from an oxirane ring wherein the coating composition has substantially no oxirane rings therein. Preferrably the acrylic polymer has a high Tg and also has therein a plurality of oxirane rings a portion of which are reacted initially with a fatty acid and then the remaining rings reacted with a secondary amine. The cathodic electrodeposition bath has the nitrogen containing composition solubilized by means of a water soluble acid.

Reference may be made to applicant's concurrently filed case U.S. Ser. No. 859,296, filed Dec. 12, 1977, now U.S. 4,155,824, CATHODIC ELECTRODEPOSITION COATING COMPOSITIONS CONTAINING DIELS-ALDER ADDUCTS.

DESCRIPTION OF PREFERRED EMBODIMENTS

The coating composition of the present invention can be prepared as follows. A solution or emulsion polymerization technique may be followed to polymerize and form an acrylic polymer.

By "acrylic polymer" is meant a polymer or copolymer containing therein the polymerized monomer of the formula:

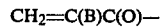

wherein B=hydrogen, methyl or ethyl.

Exemplary acrylic materials that may be employed are acrylic or methacrylic acids, the alkylesters or hydroxyalkylesters thereof where the alkyl group has from one to 18 carbon atoms, such as isobornyl acrylate, methyl(meth)acrylate, butyl(meth)acrylate, 2-ethylhexyl(meth)acrylate, steryl acrylate or methacrylate, and the like, acrylamides, methacrylamides, and the like. It is to be appreciated that other copolymerizable monomers may also be reacted with the acrylic material. Exemplary ethylenically unsaturated materials are styrene, vinyl toluene; 3,5-dimethyl styrene, p-tert-butyl styrene, alpha methyl styrene, and the like, unsaturated dicarboxylic acids or anhydrides and the alkylesters thereof from 1 to 18 carbon atoms, such as maleic anhydride, fumaric acid and the like.

A preferred class of acrylic reactants are those that contain the acrylic moiety together with an oxirane ring in the same molecule, such as glycidyl acrylate and methacrylate and other similar type materials such as those taught in U.S. Pat. No. 3,773,855, which is hereby incorporated by reference, such as acrylic and methacrylic esters of the monoglycidyl ether of sulfonyl bisphenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of $\alpha,\alpha$-bis(p-hydroxyphenyl) tolylethane; the acrylic and methacrylic esters of 3-oxy-6,7-epoxyheptanol, 3-aza-6,7-epoxyheptanol, or 3-thia-6,7-epoxyheptanol; the reaction products of one mole of acrylic or methacrylic acid with one mole of polyphenylenesulfide diglicidyl ether, polyphenyleneamine diglicidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with $\alpha,\alpha$-bis(p-hydroxyphenyl) tolylethane or $\alpha,\alpha$-bis(p-thiophenyl) tolylethane; the acrylic and methacrylic esters of poly ($C_1$-$C_4$ alkyleneoxide glycol) monoglycidyl ether; and the like.

The most preferred acrylic polymer resulting from the polymerization reaction should be one that has a Tg at least approximately 0. By "Tg" is meant glass transition state. See *Monomeric Acrylic Esters*, by E. H. Riddle, published by Reinhold Publishing Corp., reprint of Chap. I-IV, pp. 59-63.

Due to the processing of the polymers described herein, it has been found desirable to prepare the acrylic polymer or a certain hardness which will change as the fatty acid portion is reacted with the polymer. The addition of the fatty acid is to improve the flow properties of the overall polymer.

Catalysts may be used to promote the polymerization reaction such as peroxide catalysts, azo catalysts, redox catalysts and the like.

The solvent that may be used for the polymerization reaction is any solvent that is inert to the reactants and the products of the reaction. Preferably, one would employ a solvent that is miscible with water in order to make the material dispersible during the electrodeposition process. Examples of solvents are ethylene glycol monoethyl ether acetate, butyl acetate, diethylene glycol dimethyl ether, methyl isobutyl ketone, methyl n-amyl ketone, methyl n-propyl ketone, methyl ethyl ketone, alcohol methyl ether, alkanols as isopropyl alcohol, n-butanol, iso-butanol, tert-butanol and the like.

The product that has been obtained from the polymerization reaction generally contains an oxirane group which is usually introduced by virtue of an unsaturated epoxy containing monomer such as glycidyl acrylate or methacrylate or other glycidyl reactants described above.

The second step in the preparation scheme is generally a reaction of the polymer with a fatty acid which can then produce epoxyesters in a known reaction scheme (see reaction No. 1). The amount of fatty acid that is employed is generally less than one equivalent group preferably 0.1 to about 0.7 carboxylic acid groups per equivalent of oxirane ring.

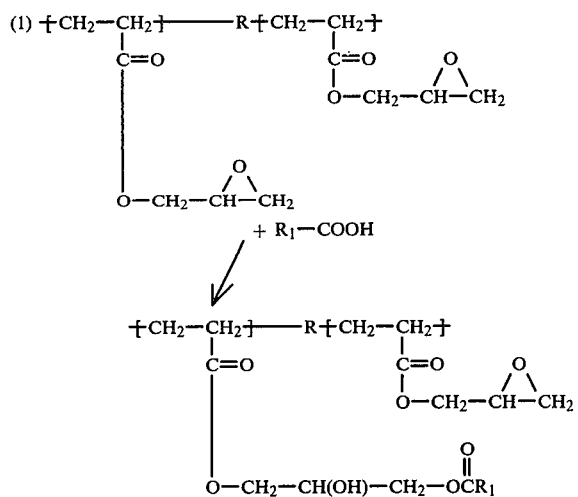

wherein
R = residue of acrylic polymer
$R_1$ = residue of fatty acid chain

The third step in the reaction is to react the polymeric material which has previously been reacted with the fatty acid with an amine (see reaction No. 2). The amine reacts with the remaining oxirane rings to produce a compound shown below.

The reaction scheme can be best expressed as follows:

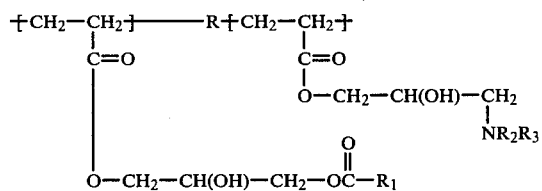

It is to be appreciated that the reactions shown above are the idealized reactions and their product. Numerous by-products may also be produced. For definition of $HNR_2R_3$, see amines, infra.

The fatty acids that may be employed are long chain fatty acids containing from 8 to 24 carbon atoms, preferrably containing single and multiple sites of unsaturation. The most preferred fatty acids are the conjugated diene fatty acids. A preferred fatty acid is one having high conjugated diene concentration such as products available under the name Pamolyn (trademark of Hercules) especially Pamolyn 380 which has a high concentration of unsaturation at positions 9 and 11 of a $C_{18}$ fatty acid. Suitable fatty acids are caprylic, capric, lauric, myristic, palmitic, palmitoleic, stearic, oleic, ricinoleic, linoleic, linolenic, eleostearic, licanic, arachidic, arachidonic, behenic, clupanodonic, lignoceric, nisinic, and the like.

The product shown in reaction No. 2 contains the moiety: $-CH_2-CH(OH)-CH_2-N<$ which is the expected result of reacting the secondary amine with the oxirane ring. For further modification of the polymer the hydroxyl group may be converted:

(a) to a ketone by reacting the product shown in reaction No. 2 with an oxidizing agent, such as permanganate, a chromic acid and the like, or (b) to a hydrogen atom by means of a Grignard type reaction such as by reacting the product shown in reaction No. 2 with HBr to convert the hydroxyl group beta to the nitrogen atom to the bromide form; then converting the bromide to a Grignard reagent by reaction with magnesium and then reacting that product with an alkanol such as methanol or propanol; or (c) to the alkoxy group by reaction with an alkyl halide; or (d) to the acyloxy form by esterification with a carboxylic acid; or (e) to the product containing $-(OR')_nH$ by reaction with an alkylene oxide of from two to four carbon atoms; or (f) to $-(OR'(CH_2OH))_nOH$ by reacting with epihalohydrin and the like and then converting to the hydroxyl form by hydrolysis; or (g) to $-(OR')_nOH$ by reaction with a glycol, and the like.

Therefore it can be said that the polymer contains Formula A which is of the structure:

$$-CH_2-C(Z)-CH_2-N<$$

wherein Z is independently selected from the group consisting of hydrogen, hydroxyl, alkyl ether of from 1 to 6 carbon atoms acyloxy of from 1 to 6 carbon atoms; (=O, as in a ketone), $-(OR')_nH$, $-(OR'(CH_2OH))_nOH$ and $-(OR')_nOH$ wherein R' is a saturated alkylene group of from 2 to 4 carbon atoms, and n is a number from 1 to 6.

It should also be appreciated that reaction sequences 1 and 2 may be reversed whereby the amine is reacted first with the oxirane rings and then the remaining rings are reacted with the fatty acid. Care must be taken in this reaction sequence to prevent gellation due to the presence of the tertiary amine which is the reaction product between the hydrogen containing amine and the oxirane ring. The tertiary amine promotes the reaction between an oxirane ring and the hydroxyl group which may be present in the polymer reactant as well as the reaction products if the amine contains a hydroxyl group thereon.

It should also be pointed out that the fatty acid that is introduced into the acrylic molecule may react with the amine if the amine is a hydroxyl containing amine, that is, reacting the fatty acid with the amine following reaction sequences shown in reaction sequence number 'and 4.

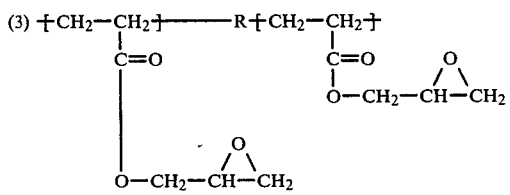

-continued
+ HNR$_2$R$_3$

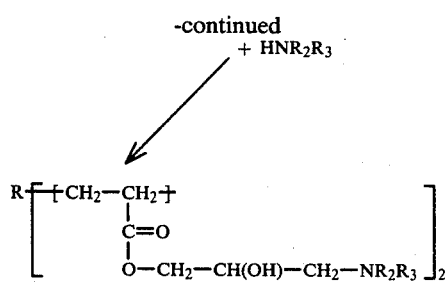

(4) Reaction No. 3 product + R$_1$COOH ⟶

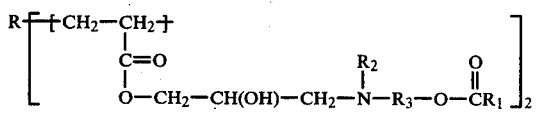

wherein R$_3$ is a hydroxyl containing group such as in diethanolamine reactant.

It is to be appreciated that to obtain a desirable product, i.e., a low viscosity resin without gellation from reaction sequences 3 and 4, it is preferred that the acrylic polymer not contain primary alcoholic groups, such as hydroxyl alkyl esters of acrylic or methacrylic acid.

Reaction No. 1 is generally conducted in an organic solvent such as those recited above under inert gas blanket at a temperature ranging up to about 200° C., preferably from about 130°–180° C., for a period of time of about one hour to produce a product having a low acid number, such as less than 5, preferrably less than one (1).

The distinct advantage of using unsaturated fatty acids is their curing ability in the presence of oxygen (air) and the need of small amounts of cross-linking agents necessary.

The amines that may be employed in the reaction 2 or 3 above is a primary or secondary amine. The reaction is performed in an organic solvent described above at a temperature ranging from about 100° C. to 150° C., for a period of time of one to three hours. The number of amine equivalents employed is generally equivalent to the number of unreacted epoxy equivalents present in the reaction medium. It may be expressed as: # amine equivalents = # epoxy equivalents = # fatty acid equivalents.

The amines that may be employed are those containing a replaceable hydrogen such as primary or secondary amines such as mono- or dialkylamine, mono- or di-alkanol amines and polyamines such as polyalkylene polyamines, etc. Useful amines are mono- or di-alkylamines having about 1 to 18 carbon atoms, such as propylamine, butylamine, diethylamine, dipropylamine, etc. Examples of mono- or di-alkanol monoamines are ethanolamine, propanolamine, diethanolamine, dipropanolamine, etc. Useful examples of other monoamines are piperidine, cyclohexylamine, pyrrolidine, morpholine, etc. Examples of polyamines are ethylenediamine, hexamethylenediamine, diethylenetriamine, triethylenetetramine, tetraethylenepentamine, propylenediamine, dipropylenetriamine, butylenediamine, N-aminoethanolamine, monoethylethylenediamine, diethylaminopropylamine, hydroxyethylaminopropylamine, monomethylaminopropylamine, piperazine, N-methylpiperazine, N-aminoethylpiperazine, etc. Particularly preferable are aliphatic mono- or polyamines having one secondary amino group, such as diethylamine, diethanolamine, diethylenetriamine monoethylethylenediamine, hydroxyethylaminopropylamine, etc. According to this invention, an aromatic amine can be used in combination with the aliphatic or alicyclic amine in such amount that the reaction product of epoxy resin and basic amine, when neutralized with acid, will still remain dispersible in water. Examples of useful aromatic amines are aniline, N-methylaniline, toluidine, benzylamine, m-xylylenediamine, m-phenylenediamine, 4,4'-diaminodiphenylmethane, etc. Use of such aromatic amine achieves the effect of increasing resistances to water and to corrosion of the coating film.

Of the above enumerated amines, diethanol amine is the most preferred.

In curing the coating composition of the present invention, it has been found highly desirable that nitrogenous containing cross-linking agents be employed in an effective curing amount. Generally the amount of nitrogen containing material that is employed is sufficient to react with some or all of the hydroxyl groups present on the polymeric material or the number of hydroxyl groups present on Formula A contained in the polymeric material. If desired, the amount of fatty acid containing unsaturation may be increased to produce an air dried composition.

When a cross-linking agent is employed, it is preferred that a blocked isocyanate or a melamine type containing composition be used as the cross-linking agent. Other cross-linking agents may also be used such as urea formaldehyde, phenol formaldehyde, benzoguanamine, amideimide, polyamide, polybenzimidazole, and the like.

Suitable isocyanates that may be used in the present invention are as follows:
propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate, 2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanate, such as methylpropylbenzene diisocyanate, methylethylbenzene diisocyanate, and the like,
2-2'-biphenylene diisocyanate,
3,3'-biphenylene diisocyanate,
4,4'-biphenylene diisocyanate,
3,3'-dimethyl-4.4'-biphenylene diisocyanate, and the like,
methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like,
2,2'-oxydiphenyl diisocyanate,
3,3'-oxydiphenyl diisocyanate,
4,4'-oxydiphenyl diisocyanate, and the like,
2,2'-ketodiphenyl diisocyanate,
3,3'-ketodiphenyl diisocyanate, 4,4'-ketodiphenyl diisocyanate,
2,2'-thiodiphenyl diisocyanate,
3,3'-thiodiphenyl diisocyanate,
4,4'-thiodiphenyl diisocyanate, and the like,
2,2'-sulfonediphenyl diisocyanate,
3,3'-sulfonediphenyl diisocyanate,
4,4'-sulfonediphenyl diisocyanate, and the like,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl) sulfide,
bis-(para-isocyano-cyclohexyl) sulfone,
bis-(para-isocyano-cyclohexyl) ether,
bis-(para-isocyano-cyclohexyl) diethyl silane,
bis-(para-isocyano-cyclohexyl) diphenyl silane,
bis-(para-isocyano-cyclohexyl) ethyl phosphine oxide,
bis-(para-isocyano:cyclohexyl) phenyl phosphine oxide,
bis-(para-isocyano-cyclohexyl) N-phenyl amine,
bis-(para-isocyano-cyclohexyl) N-methyl amine,
2,6-diisocyano-pyridine,
bis-(4-isocyano-phenyl) diethyl silane,
bis-(4-isocyano-phenyl) diphenyl silane,
dichloro-biphenylene diisocyanate, bis-(4-isocyano-phenyl) ethyl phosphine oxide,
bis-(4-isocyano-phenyl) phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-β-isocyano-t-butyl) toluene,
bis-(para-β-isocyano-t-butyl-phenyl) ether,
para-bis-(2-methyl-4-isocyano-phenyl) benzene, para-bis-(1,1-dimethyl-5-amino-pentyl)benzene, 3,3'-diisocyano adamantane,
3,3'-diisocyano biadamantane,
3,3''-diisocyanoethyl-1,1'-biadamantane,
1,2-bis-(3-isocyano-propoxy) ethane,
1,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2 O(CH_2)_3 NCO$,
$OCN(CH_2)_3 S(CH_2)_3 NCO$,
$OCN(CH_2)_3 N(CH_2)_3 NCO$,
polymethylene polyphenyl isocyanate;
biurets of the formula

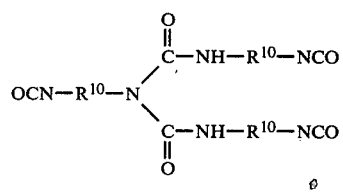

where $R^{10}$ is an alkylene group having 1-6 carbon atoms, especially preferred is the biuret of hexamethylene diisocyanate;

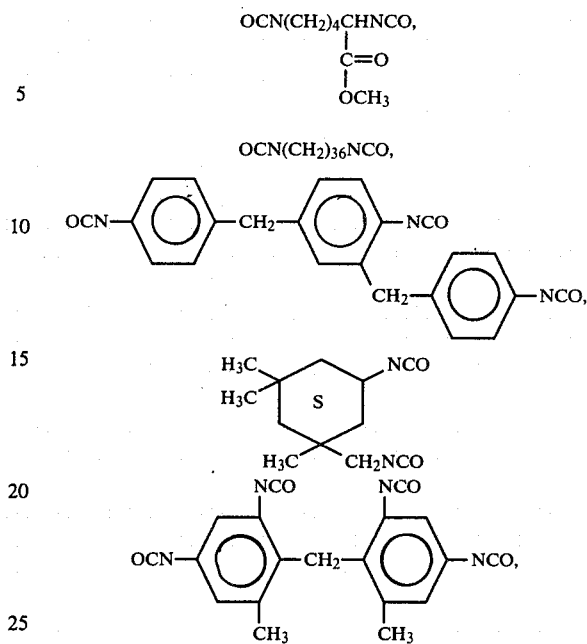

A number of blocking agents may also be used to produce a blocked isocyanate which could be used as the cross-linking agent. Such blocking agents as the phenol type, lactone type, active methylene type, alcohol type, mercaptan type, acid amide type, the imide, the amine type, the urea type, carbamate type, oxime type, sulfate type and the like. Most preferrably a ketoxime type is preferred, and even more preferrably a dialkyl ketoxime of from 1 to 4 carbon atoms per alkyl group. Most preferrably the ketoxime would be methylethyl ketoxime, methyl-isobutyl ketoxime, and the like.

Suitable melamine type cross-linking agents are hexamethoxymethyl melamine, alkylated (melamine-formaldehyde), butylated melamines, and the like.

The coating compositions of the present invention are useful in the cathodic electrodeposition of substrates. Generally the bath pH ranges from about 3-9. The substrate may be any conductive substrate, preferrably iron, zinc or aluminum containing substrates such as steel, with or without protective coatings, such as phosphate corrosion resistant coatings. Most preferrably the coatings of the present invention are applied to metallic substrates, such as steel.

In the electrodeposition process, the conductive metallic substrate would be the cathode in the electrical process and an anode would be placed in the electrodeposition bath, with the electrodeposition coating of the present invention being incorporated in the aqueous electrolyte between the anode and the cathode. The electrodeposition process is one that would be conducted at a temperature ranging from about 50° F. to 150° F., preferrably room temperature. The voltage may vary greatly, although normally it will operate between 50 and 500 volts. The current density ranges from about 1 amp to about 15 amps per square foot.

The nitrogen containing coating compositions of the present invention are solubilized, dispersed or suspended by means of an acid, such as an organic acid, such as acetic acid, lactic acid, citric acid and the like, although any water solubilizing agent may be used as boric or hydrochloric acid, etc.

As has been mentioned above, if a high concentration of unsaturated fatty acids are employed, the composition may be air cured. Preferably, however, the coating compositions are cured by means of subjecting the coated substrate to a high temperature or a bank of infrared lamps having a temperature ranging from about 250° F. (121° C.) to about 500° F. (260° C.), preferrably between about 300° F. (149° C.) and about 390° F. (199° C.) from a time ranging from about 1 minute to 1 hour, preferrably 10 minutes to 45 minutes.

It is to be appreciated that a curing catalyst may also be added to the coating composition, such as tin compounds as dibutyl tin dilaurate, dibutyl tin diacetate, dibutyl tin oxide, metallic dryers as cobalt and zirconium naphthenate or octoate.

When a blocked isocyanate is employed as described above, it is to be appreciated that the blocking agent will decompose at temperatures greater than 50° C. which will permit the remaining isocyanate moiety to react with the film forming composition. At less than about 50° C., the blocked isocyanate is substantially stable and is nonreactive with the hydroxyl groups present on the acrylic polymer, or the hydroxyl groups present on Formula A moiety.

In known manner, catalysts, pigments, anti-oxidants, surfactants or fillers may be added to the coating composition to improve the appearance, texture, gloss and other properties of the cured film. Pigments such as carbon black, titanium dioxide, metal oxides, chromates, sulfates and the like may be used.

The components of the coating composition (on a pigment, filler and catalyst free basis) are generally present as follows:

| Components | Amount by Weight | |
|---|---|---|
| | Range | Preferred |
| Resin | | |
| Monomer (total) | about 60–about 80 | 72 |
| oxirane portion | about 20–about 50 | about 25–about 40 |
| Fatty acid | about 5–about 25 | 14 |
| Formula A producing amine | Balance | Balance |
| TOTAL | 100 | 100 |

The amount of cross-linking agent employed will range from 10–40, preferably 20–30% by weight of the total of resin plus cross-linking agent, especially when melamine resin is employed. The cross-linking agent is used (on an equivalent basis) especially when an isocyanate cross-linking agent is used in a range of 1:0.5–1.1-::OH/NCO. To increase adhesion of coating substrate OH groups are present. On the other hand, an increase in NCO content is required for proper cross-linking.

Having described the invention in general, listed below are embodiments wherein all parts are in parts by weight and all temperatures are in degrees Centigrade, unless otherwise indicated.

EXAMPLE NO. 1

Into a beaker equipped with a stirrer, thermometer and reflux condenser, under a nitrogen atmosphere was added ethylene glycol monoethyl ether acetate (214 parts) and para-cymene (54 parts) to a temperature of 150°. Over a 2-3 hour period was added styrene (525 parts), azo catalyst (2,2'-azo bisisobutyronitrile—45 parts), glycidyl methacrylate (GMA)–(600 parts), and isobornyl methacrylate (375 parts). Thereafter the mixture was post cooked for two hours and then di-tert-butyl peroxide (6 parts) was added and heated for an hour at 146° C. Pamolyn 380 (trade mark of Hercules for a fatty acid composition containing 20% oleic acid, 76% total linoleic acids with 68% conjugated linoleic acid)—(300 parts) was then added and the temperature raised to 150° C. and heated for about two hours until the acid number was about 1. The product was cooled to 103° C. Thereafter n-butanol (272 parts) and diethanolamine (309 parts) was added and heat maintained at 118° C. for about 1½ hours. The viscosity of the product (25° C.; 40% theoretical solids in n-butanol) was E with an amine value of 84.4.

An electrocoating composition was formulated by taking the product prepared above (364.3 parts) and blending it with Cymel 1116 (trademark of Cyanamid for a melamine cross-linking agent)—(102 parts), acetic acid (13.4 parts) and Modaflow (trademark of Monsanto for a flow control agent containing alkylesters of acrylic acid having a low molecular weight)—(2 parts). The mixture is placed in Cowles mixer and deionized water added slowly until inversion takes place. The composition was placed in an electrocoating apparatus having a carbon anode and a steel cathode treated with zinc phosphate corrosion resistant coating. Total solids content is about 12%. The voltage of 300V was applied and the film deposited onto the cathode at a thickness of about 0.63 mils. The coated substrate was cured for 20 minutes in an oven set at 400° F. (204.4° C.). The cured film on the substrate was subjected to a salt spray chamber having 5% by weight sodium chloride spray for up to 670 hours. The film creepage at the scribe was less than ⅛ inch.

EXAMPLE NO. 2

Following the procedure of Example No. 1, the following materials were reacted:

| | Parts by Weight |
|---|---|
| styrene | 525 |
| GMA | 600 |
| butyl acrylate | 375 |
| azo catalyst | 45 |
| di-tert-butyl peroxide | 6 |
| DCO-FA* | 300 |
| diethanol amine | 330 |

*DCO-FA is dehydrated castor oil fatty acid having about 30% conjugated double bonds.

The product had an amine value of 78.3 with a viscosity of F at 25° C., 40% total solids in n-butanol.

A cathodic electrodeposition film was formed on an iron phosphate treated steel cathode following the process of Example No. 1. After 264 hours of salt spray testing, the film appeared satisfactory. On a zinc phosphate treated panel, the corrosion resistance was better than that of Example No. 1. Negligible amount of chaulking occurred on accelerated ultraviolet light exposure after 332 hours.

EXAMPLE NO. 3

A coating composition was prepared following the preparative steps of Example No. 1, employing the following reactants:

| Components | Parts by Weight |
|---|---|
| styrene | 525 |
| methyl methacrylate | 375 |

| Components | Parts by Weight |
| --- | --- |
| GMA | 600 |
| Pamolyn 380 | 300 |
| diethanolamine | 309 |

The product had an amine value of 83.8 and a viscosity of H (25° C.; 40% theoretical solids in n-butanol).

EXAMPLE NO. 4

A coating composition was produced according to the process of Example No. 1 but having the following reactants for the acrylic polymer (the other reactants and their amounts being the same as Example No. 1) and using methyl isobutyl ketone as a solvent in place of ethylene glycol monoethyl ether acetate.

| | Parts by Weight |
| --- | --- |
| styrene | 525 |
| GMA | 600 |
| methyl methacrylate | 60 |
| butyl acrylate | 315 |

The polymer produced prior to reaction with the fatty acid had a Tg value of 34. The product finally produced had a viscosity of G at 25° C. in 40% theoretical solids in n-butanol and an amine value of 72.5 and a hydroxyl equivalent of 302.

Into another beaker equivalently equipped as in Example No. 1 was placed isophorone diisocyanate (401.6 parts) and ethylene glycol monoethyl ether acetate (102.8 parts). Over two hours methyl ethyl ketoxime (317.6 parts) was added allowing the temperature to rise to 100° C. and maintaining it at that temperature. The mixture was heated an additional two hours at 100° C., checked to determine NCO content was O, cooked an additional one-half hour and cooled.

A mill base was prepared by mixing the acrylic product (348 parts) produced above, with n-butanol (246 parts), carbon black (66 parts), which mixture was ground to a Hegeman rating of 6¾. An electro-coating composition was prepared by mixing together the acrylic resin produced above (342.3 parts) zirconium octoate (2 parts), mill base (80 parts), blocked isocyanate (112 parts), acetic acid (6.8 parts) and deionized water, having 10.8% non-volatiles and 2% pigment with a OH/NCO ratio of 1.92. Two zinc phosphate treated steel panels were electro-coated as a cathode, one at a film thickness of about 0.64 mils at 180 volts and the second at about 0.76 mils at 220 volts. After 228 hours of 5% salt spray exposure, the first panel had 0–1 mm. pull from the scribe and no face or edge blistering, while the second panel had 0–0.5 mm. pull from the scribe and no face or edge blistering.

What is claimed is:

1. An organic coating composition containing a dispersion, solution or suspension of a coating composition containing an acrylic polymer; the coating composition characterized as containing (a) an ester resulting from reacting an acrylic polymer with a fatty acid, and (b) Formula A within said polymer molecule, and said Formula A group being derived from an oxirane ring, wherein the coating composition has substantially no oxirane rings therein:

Formula A: —CH$_2$—C(Z)—CH$_2$—N= 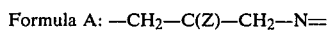

wherein Z is independently selected from the group hydrogen, hydroxyl, alkyl ether having from 1 to 6 carbon atoms; acyloxy having from 1 to 6 carbon atoms;

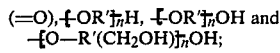

wherein R' is a saturated alkylene group of from 2 to 4 carbon atoms and n is a number 1 to 6.

2. The composition of claim 1 wherein the coating composition is comprised of a resin portion characterized as follows:

| Components | Parts by Weight |
| --- | --- |
| a total monomer portion used to produce polymer | about 60 to about 80 |
| b fatty acid portion | about 5 to about 25 |
| c Formula A producing amine portion | balance | wherein the total resin components equals 100 parts on a pigment, filler and catalyst free basis.

3. The composition of claim 2 wherein the monomer containing the oxirane ring comprises about 20% to about 50% of the total monomer used to produce the acrylic polymer.

4. The composition of claim 1 wherein Z is hydroxyl.

5. The composition of claim 1 wherein the composition is comprised of a resin wherein the number of equivalents of carboxylic acid employed is no greater than the number of equivalents of oxirane ring employed.

6. The composition of claim 5 wherein the coating composition is comprised of a resin having carboxylic acid equivalents and oxirane ring equivalents in a ratio of 0.1 to 0.7::acid:oxirane ring.

7. The composition of claim 1 further comprising an effective amount of a nitrogenous cross-linking material.

8. A cathodic electrodeposition coating composition comprising an aqueous solution containing an organic solubilizing acid and the composition of claim 1.

9. The composition of claim 1 comprised of a polymerized resin prepared from monomers of glycidyl methacrylate and other monomers copolymerizable therewith; said polymer first being reacted with a fatty acid and that product then reacted with a secondary alkanol amine.

10. A cathodic electrodeposition coating composition comprising an aqueous solution containing an organic solubilizing acid and the composition of claim 2.

11. A cathodic electrodeposition coating composition comprising an aqueous solution containing an organic solubilizing acid and the composition of claim 3.

12. A cathodic electrodeposition coating composition comprising an aqueous solution containing an organic solubilizing acid and the composition of claim 4.

13. A cathodic electrodeposition coating composition comprising an aqueous solution containing an organic solubilizing acid and the composition of claim 5.

14. A cathodic electrodeposition coating composition comprising an aqueous solution containing an organic solubilizing acid and the composition of claim 6.

15. A cathodic electrodeposition coating composition comprising an aqueous solution containing an organic solubilizing acid and the composition of claim 9.

16. A cathodic electrodeposition coating composition comprising an aqueous solution containing an organic solubilizing acid and the composition of claim 8.

UNITED STATES PATENT OFFICE
CERTIFICATE OF CORRECTION

Patent No. 4,231,907        Dated November 4, 1980

Inventor(s) Ivan H. Tsou

It is certified that error appears in the above-identified patent and that said Letters Patent are hereby corrected as shown below:

In Column 12, Line 67, in Claim 16, the claim reference numerical "8", should read --- 7 ---.

Signed and Sealed this

Seventh Day of April 1981

[SEAL]

Attest:

RENE D. TEGTMEYER

*Attesting Officer*     *Acting Commissioner of Patents and Trademarks*